United States Patent

[11] 3,623,823

| [72] | Inventor | George Val<br>Daellikon, Switzerland |
|---|---|---|
| [21] | Appl. No. | 864,583 |
| [22] | Filed | Oct. 8, 1969 |
| [45] | Patented | Nov. 30, 1971 |
| [32] | Priority | Oct. 14, 1968 |
| [33] | | Switzerland |
| [31] | | 15313/68 |

[54] PORTABLE APPARATUS FOR PRODUCING CIRCULAR OPENINGS IN WORKPIECES
9 Claims, 3 Drawing Figs.

| [52] | U.S. Cl. | 408/76, 408/137 |
|---|---|---|
| [51] | Int. Cl. | B23b 45/14, B23b 47/18 |
| [50] | Field of Search | 77/59 A, 34.7, 13, 77; 408/76, 137 |

[56] References Cited
UNITED STATES PATENTS

| 672,284 | 4/1901 | Nuttall | 77/34 7 X |
|---|---|---|---|
| 1,946,214 | 2/1934 | Kabigting | 77/59 A |

FOREIGN PATENTS

| 2,127 | 1904 | Great Britain | 77/13 |

Primary Examiner—Francis S. Husar
Attorney—Flynn & Frishauf

ABSTRACT: A portable apparatus for producing circular openings in workpieces, by use of a magnetic stand for supporting a spindle. A spindle is connected with the stator of a motor, the rotor thereof driving a shaft carrying a circle cutter. The spindle is threaded and can be rotated to be advanced axially relative to the workpiece during machining. The pitch of the spindle thread is selected to absorb reaction forces and permit freeing of the cutter in case it should bind.

GEORG VAL
INVENTOR.

PORTABLE APPARATUS FOR PRODUCING CIRCULAR OPENINGS IN WORKPIECES

The present invention generally to an improved apparatus or equipment for producing circular openings in workpieces.

The production of large openings or round holes in the interior of metal plates of large area or in fixed installations, for example in the ship-building industry, has in the past presented difficulties and been very time consuming. Normally it has been necessary to drill a series of closely contiguous holes along the periphery of the intended openings and, following breaking out of the core, the edge of such opening has to be finished by hand.

The use of circle cutters for the mentioned purpose has often failed in the past because the working radius of the usual stationary boring machines has not been large enough, while with hand-guided boring machines the feed movement and direction stability could not be performed sensitively enough for such circle cutters. As a consequence the cutting tools tend to bind and even to become hooked into the workpiece which may lead to breaking of the tool and often to damaging of the workpiece.

Accordingly, it is a primary object of the present invention to provide an improved apparatus which enables producing of substantially round openings in workpieces at high-machining efficiencies.

A further object of the present invention is to provide an equipment or apparatus which makes possible the use of a magnetic stand for supporting the spindle carrying the circle cutter.

Still a further significant object of the invention is directed to an improved apparatus for the production of round openings or grooves in workpieces wherein the axial advance relative to the workpiece during machining is effected counter to the force of reaction so that a very sensitive movement to the respective cutting conditions is possible.

Another object of the present invention is to provide a portable apparatus which is suitable for making individual holes, that is, apparatus which can readily be carried by one man.

SUBJECT MATTER OF THE INVENTION

A magnetic stand supports a spindle head within which a threaded spindle is located which carries the stator of a motor. The rotor drives a shaft passing through the spindle to the workpiece. The pitch of the thread on the spindle is selected to be just nonbinding to absorb reaction forces and permit freeing the cutter in case it should bind.

The invention will be better understood, and objects other than those set forth above, will become apparent, when consideration is given to the following detailed description taken in conjunction with the accompanying drawings, wherein.

Figure 1:
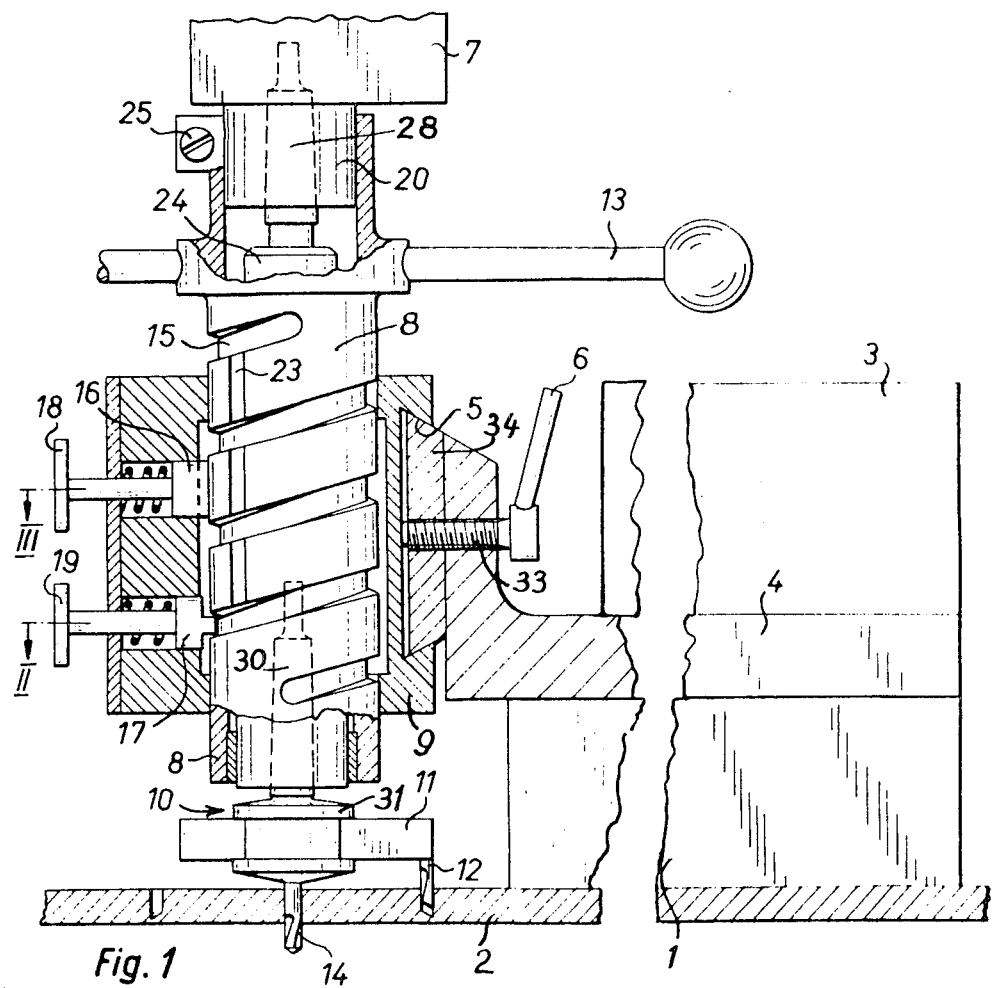
FIG. 1 is a vertical section through the equipment.
Figure 2:
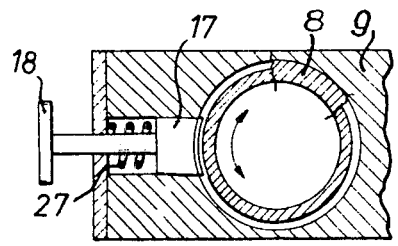
FIG. 2 is a horizontal section through the equipment taken on line II of FIG. 1.
Figure 3:
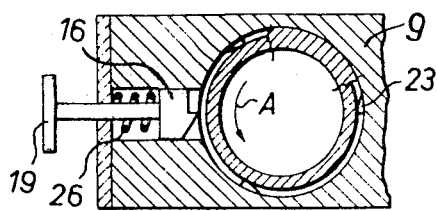
FIG. 3 is a horizontal section through the equipment taken on line III of FIG. 1.

In FIG. 1 an electromagnetic block 1 is set on a steel plate 2. The electrical equipment received for this magnetic block 1 such as transformer, switches and the like are well-known and are contained in a housing 3 located above an angle-shaped support or stand 4. A plate 34 lies against the vertical surface of the stand 4, detachably engages in a dovetail guide 5 in a spindle head 9 and can be clamped with the aid of a hand lever 6 and a thread bolt 33.

A spindle 8 provided with a thread 15 is inserted in a vertical bore in this spindle head 9. A shaft 24 is rotatably mounted in the interior of the spindle 8 and has a tapered shank 28 at the top which engages in the cylindrical extension 20 of the housing of a drive motor 7. A tapered bore is located at the lower end of the shaft 24 for accommodating the circle cutter 10 provided with a tapered shank 30. The cylindrical extension 20, which is rigidly joined to the motor 7 or an intermediately positioned gearing, is detachably clamped with the aid of a retaining screw 25 by the hollow spindle 8 having a slit at the top.

Hand-rotatable extending arms 13 project in the radial direction from the upper part of the spindle. A threaded plug 17 guided in the spindle head 19 protrudes into the thread 15 of the spindle. This threaded plug can be brought out of engagement with the thread 15 against the action of a spring 27 by pulling out with the aid of a button 19.

The spindle 8 is provided with three grooves 23 distributed around its periphery and extending in the longitudinal direction of the spindle. Each of these grooves 23 has a steep flank and a shallow flank. These grooves 23 are intended to coact with a pawl 16 in order to prevent the spindle from rotating backwards—i.e. in the direction of arrow A—by more than 120°. This pawl 16 can be brought out of engagement with the relevant grooves 23 by pulling out the button 19 against the action of the compression spring 26, so that subsequently the spindle 8 can be pulled out of the spindle head 9 in the axial direction when the threaded plug 17 is also in the disengaged position.

The actual circle cutter 10 or cutting device is provided with a holder 11 that can slide transversely to the axis of rotation of the spindle and can be fixed in the head 31 in the desired position. The holder 11 accommodates the actual cutter insert 12, which normally is constructed as a metal-cutting tool. This elongated cutter insert 12 is slanted backwards by at least 5° relative to the direction of rotation during working and has a positive cutting angle. Such circular cutting device and cutting tool are for instance described in detail in U.S. Pat. Nos. 3,468,197 and 3,470,597. The cutting edge is located behind a plane formed by the axis of rotation of the spindle and the longitudinal axis of the holder 11 relative to the direction of rotation during working. It is thus possible to speak of the cutter insert or cutting tool as trailing behind.

At its center the circle cutter 10 is provided with a drill 14 with which as a preliminary step a center hole can be drilled into the workpiece 2. The rear cylindrical portion of the drill 14 is acting as a guide during the subsequent cutting out process with the aid of the cutter insert 12.

By loosening of the hand lever 6 with its associated setscrew 33 it is possible to pull out the spindle head 9 laterally from the dovetail guide 5 as a whole together with the spindle 8, and in its place a gauge may be inserted with which the center of the opening to be cut can be easily located or adjusted. The magnetic stand 1 which initially lies loosely on the workpiece 2 can be brought accurately into the correct position by sliding. Subsequently, the current for the electromagnet is switched on to make the latter hold on to the workpiece 2 by magnetic action. For the axial feeding of the spindle 8 and hence of the circle cutter 10 the projecting arms 13 can be turned by hand to result in the spindle 8 together with the flanged on motor winding downwards and advance relative to the workpiece.

During machining by means of the cutter insert 12 or tool a reaction torque acting counter to the rotary feed movement is exercised on the spindle 8 and has to be overcome at the projecting arm 13 by hand. If the cutting tool 12 were now to hook into the material 2, then the reaction torque becomes large and the machinist can raise the spindle 8 and hence the cutter insert 12 somewhat by a rotary movement counter to the feed movement and in this way usually free the cutter insert 12. However, in order to prevent such a backward rotation from entailing the risk of an accident for the operator it is limited to at most 120°, at which value the pawl 16 comes into engagement and prevents further backward rotation.

Since the electric motor 7 also carries out the rotary movement of the spindle 8 during the feeding movement and machining, it is connected with a flexible connecting cable sharing in this motion. Alternatively, however, sliding contact rings may be provided.

It would be possible to fabricate the shaft 24 and the head 31 of the circle cutter from a single piece.

Enabling the magnetic stand 1, 3, 4 on the one hand and the spindle head 9 with spindle and motor 7 on the other to be mechanically separated is suitable for creating individual units that can be readily carried and transported by one man.

In addition to the position shown, in which the axis of rotation is vertical, the equipment could naturally be used also in desired other positions.

The angle of the thread 15 is selected to be such that just no self-locking, or finding is present and is therefore preferably about 10°–15°. Since the self-locking or automatic-locking limit is only narrowly exceeded, part only of the force of reaction arising during machining becomes effective at the projecting arms 13.

In addition to making circular cuts in solid flat steel sheets or the like it is possible to cut out segments in domed or curved surfaces, with care having to be taken that the magnetic stand can hold firmly to a bearing surface in reliable manner.

While there has been described and illustrated preferred embodiments of the above invention it is apparent that numerous alterations, omissions and additions may be made without departing from the spirit thereof.

I claim:

1. A portable hole cutter apparatus adapted to carry a material removing cutter for producing openings or grooves in workpieces, comprising
    support means;
    a spindle head extending laterally from said support means;
    a spindle passing through said spindle head and being formed at its periphery with a thread;
    internal thread means in said spindle head engaging the spindle thread;
    a shaft rotatably mounted in said apparatus
    said shaft being adapted to carry said cutter at one end;
    a motor having a rotor and a stator, the rotor being connected in driving engagement with the other end of said shaft and the stator being connected to said spindle;
    and, at least one feed element to turn said spindle to advance said cutter in axial direction relative to a workpiece and counter to the force of cutting reaction during machining by engagement of said spindle thread and said spindle head thread means;
    the pitch of said thread being selected to be just above the self-locking angle.

2. An apparatus as defined in claim 1, wherein said feed element comprises at least two substantially radially projecting arms extending from said spindle for rotary and forward movement of said spindle and located between the motor and the support means.

3. Apparatus as defined in claim 1, wherein the spindle comprises at least one groove extending in axial direction;
    pawl means are provided coacting with said groove, said pawl means being located in said spindle head and being hand-disengageable;
    said pawl means, upon engagement, preventing full rotary movement of the spindle counter the rotary direction of the feed.

4. An apparatus as defined in claim 3, wherein said spindle comprises a plurality of axial grooves uniformly distributed over the periphery of the spindle.

5. An apparatus as defined in claim 1, comprising a hand-disengageably mounted plug, the internal thread of said spindle head extending only over the length of said plug, so that the spindle can be separated from said spindle head in axial direction after disengagement of said plug.

6. An apparatus as defined in claim 1, wherein said support is an electromagnetic stand.

7. Apparatus as defined in claim 6, including quick-release-coupling means interconnecting the electromagnetic stand and the spindle head.

8. An apparatus as defined in claim 1, wherein the pitch angle of said spindle thread is between about 10° and 15°.

9. Apparatus as defined in claim 1, wherein said motor has a housing, said spindle being detachably connected to the housing of the motor so that the motor is affecting all movements of said spindle and the drive shaft of the motor being drivingly connected to the spindle.

* * * * *